US012595746B2

(12) United States Patent
Chatelois et al.

(10) Patent No.: US 12,595,746 B2
(45) Date of Patent: Apr. 7, 2026

(54) AIRCRAFT PROPULSION SYSTEM WITH CLOCKED ELECTRIC MACHINE AND ACCESSORY GEARBOX

(71) Applicant: Pratt & Whitney Canada Corp., Longueuil (CA)

(72) Inventors: Bruno Chatelois, Boucherville (CA); Paul Weaver, Chateauguay (CA); Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/756,448

(22) Filed: Jun. 27, 2024

(65) Prior Publication Data

US 2026/0002451 A1     Jan. 1, 2026

(51) Int. Cl.
| | |
|---|---|
| *F01D 15/10* | (2006.01) |
| *B64D 35/022* | (2024.01) |
| *F02C 7/32* | (2006.01) |
| *F02C 7/36* | (2006.01) |

(52) U.S. Cl.
CPC ........... *F01D 15/10* (2013.01); *B64D 35/022* (2024.01); *F02C 7/32* (2013.01); *F02C 7/36* (2013.01); *F05D 2260/4031* (2013.01)

(58) Field of Classification Search
None
See application file for complete search history.

(56) References Cited

U.S. PATENT DOCUMENTS

| | | | |
|---|---|---|---|
| 7,055,303 B2 | 6/2006 | Macfarlane | |
| 8,966,911 B2* | 3/2015 | Ress, Jr. ................. | F02C 7/275 |
| | | | 60/788 |
| 10,066,551 B2* | 9/2018 | Verseux .................... | F02C 7/32 |

(Continued)

FOREIGN PATENT DOCUMENTS

| | | |
|---|---|---|
| FR | 3016408 B1 | 5/2019 |
| FR | 3061241 B1 | 1/2021 |

OTHER PUBLICATIONS

Unknown: "Rolls-Royce AE 2100—Wikipedia", Jul. 23, 2020 (Jul. 23, 2020), pp. 1-4, XP093309938, Retrieved from the Internet: URL:https://en.wikipedia.org/w/index.php?title=Rolls-Royce_AE_2100&oldid=969195800.

(Continued)

*Primary Examiner* — Juan G Flores
(74) *Attorney, Agent, or Firm* — Getz Balich LLC

(57) ABSTRACT

A propulsion system is provided for an aircraft. This propulsion system includes a geartrain, a propulsor rotor, a turbine engine core, an electric machine and an accessory gearbox system. The propulsor rotor is disposed to a first side of the geartrain. The turbine engine core is disposed to a second side of the geartrain. The turbine engine core is operatively coupled to the propulsor rotor through the geartrain. The electric machine is disposed to the second side of the geartrain. The electric machine is operatively coupled to the propulsor rotor and/or the turbine engine core through the geartrain. The accessory gearbox system is operatively coupled to the turbine engine core. The accessory gearbox system is circumferentially offset from the electric machine about a centerline axis of the turbine engine core. The accessory gearbox system axially overlaps the electric machine along the centerline axis of the turbine engine core.

17 Claims, 6 Drawing Sheets

(56)          References Cited

U.S. PATENT DOCUMENTS

| | | | |
|---|---|---|---|
| 10,180,080 B2* | 1/2019 | Munevar | B64D 33/00 |
| 11,174,796 B2 | 11/2021 | Bewick | |
| 11,535,392 B2 | 12/2022 | Latulipe | |
| 11,674,449 B2 | 6/2023 | Weaver | |
| 2011/0154827 A1* | 6/2011 | Ress, Jr. | F02C 7/32 |
| | | | 60/39.15 |
| 2015/0267616 A1* | 9/2015 | Verseux | F02C 7/18 |
| | | | 60/772 |
| 2016/0333793 A1 | 11/2016 | Prunera-Usach | |
| 2017/0190441 A1 | 7/2017 | Mackin | |
| 2017/0260872 A1* | 9/2017 | Munevar | B64D 31/18 |

OTHER PUBLICATIONS

Various: "Turboprop Engines—an overview | ScienceDirect Topics", Dec. 31, 2003 (Dec. 31, 2003), pp. 1-10, XP093309764, Retrieved from the Internet: URL:https://www.sciencedirect.com/topics/engineering/turboprop-engines.
EP Search Report for EP Patent Application No. 25186058.1 dated Sep. 9, 2025.

* cited by examiner 20,26

24

42

120

116

56

34

66

28

120

110

114

116

116

112

120

30,104

64,68

Gravity

AIRCRAFT PROPULSION SYSTEM WITH CLOCKED ELECTRIC MACHINE AND ACCESSORY GEARBOX

TECHNICAL FIELD

This disclosure relates generally to an aircraft and, more particularly, to a propulsion system for the aircraft with an electric machine.

BACKGROUND INFORMATION

A hybrid-electric propulsion system for an aircraft may include a gas turbine engine paired with an electric motor. Various arrangements of hybrid-electric propulsion systems are known in the art. While these known hybrid-electric propulsion systems have various benefits, there is still room in the art for improvement.

SUMMARY

According to an aspect of the present disclosure, a propulsion system is provided for an aircraft. This propulsion system includes a geartrain, a propulsor rotor, a turbine engine core, an electric machine and an accessory gearbox system. The propulsor rotor is disposed to a first side of the geartrain. The turbine engine core is disposed to a second side of the geartrain. The turbine engine core is operatively coupled to the propulsor rotor through the geartrain. The electric machine is disposed to the second side of the geartrain. The electric machine is operatively coupled to at least one of the propulsor rotor or the turbine engine core through the geartrain. The accessory gearbox system is operatively coupled to the turbine engine core. The accessory gearbox system is circumferentially offset from the electric machine about a centerline axis of the turbine engine core. The accessory gearbox system axially overlaps the electric machine along the centerline axis of the turbine engine core.

According to another aspect of the present disclosure, another propulsion system is provided for an aircraft. This propulsion system includes a geartrain, a propulsor rotor, a turbine engine core, an electric machine and an accessory gearbox. The propulsor rotor is disposed to a first side of the geartrain. The turbine engine core is disposed to a second side of the geartrain. The turbine engine core is operatively coupled to the propulsor rotor through the geartrain. The electric machine is disposed to the second side of the geartrain. The electric machine is operatively coupled to at least one of the propulsor rotor or the turbine engine core through the geartrain. The accessory gearbox is operatively coupled to the turbine engine core. The accessory gearbox is circumferentially offset from the electric machine about a centerline axis of the turbine engine core. The centerline axis of the turbine engine core is laterally offset from a rotational axis of the propulsor rotor.

According to still another aspect of the present disclosure, another propulsion system is provided for an aircraft. This propulsion system includes a geartrain, a propulsor rotor, a turbine engine core, an electric machine and an accessory gearbox. The propulsor rotor is disposed to a first side of the geartrain. The turbine engine core is disposed to a second side of the geartrain. The turbine engine core includes a first rotating structure, a second rotating structure, a combustor and a flowpath. The first rotating structure includes a first structure compressor rotor and a first structure turbine rotor. The second rotating structure is operatively coupled to the propulsor rotor through the geartrain. The second rotating structure includes a second structure compressor rotor and a second structure turbine rotor. The flowpath extends sequentially across the second structure compressor rotor. The first structure compressor rotor, the combustor, the first structure turbine rotor and the second structure turbine rotor are between an inlet into the flowpath and an exhaust from the flowpath. The electric machine is disposed to the second side of the geartrain. The electric machine is operatively coupled to at least one of the propulsor rotor or the second rotating structure through the geartrain. The accessory gearbox is operatively coupled to the first rotating structure. The accessory gearbox is circumferentially offset from the electric machine about a centerline axis of the turbine engine core. The accessory gearbox is coupled to the first rotating structure through a tower shaft. The tower shaft is disposed axially between the second structure compressor rotor and the first structure compressor rotor.

The electric machine and the accessory gearbox system may be disposed to opposing sides of the turbine engine core.

A center of the accessory gearbox system may be spaced circumferentially from a center of the electric machine between thirty degrees and one-hundred and eighty degrees about the centerline axis of the turbine engine core.

The electric machine may be disposed vertically above the turbine engine core.

The accessory gearbox system may be disposed vertically below the turbine engine core.

The accessory gearbox system may be disposed to a horizontal side of the turbine engine core.

A portion of the electric machine may be disposed axially between the geartrain and the accessory gearbox system.

An entirety of the electric machine may be disposed axially between the geartrain and an end of the accessory gearbox system.

The accessory gearbox system may be circumferentially aligned with an airflow inlet into the propulsion system.

The electric machine may be configurable at least as an electric motor.

The electric machine may be configurable at least as an electric generator.

The accessory gearbox system may include an engine accessory and an accessory gearbox operatively coupling the engine accessory to the turbine engine core.

The turbine engine core may include a first rotating structure. The first rotating structure may include a first structure compressor rotor and a first structure turbine rotor. The accessory gearbox system may be coupled to the first rotating structure through a tower shaft.

The turbine engine core may also include a second rotating structure. The second rotating structure may include a second structure turbine rotor. The second rotating structure may be operatively coupled to the propulsor rotor through the geartrain.

The second rotating structure may also include a second structure compressor rotor. The tower shaft may be disposed axially between the first structure compressor rotor and the second structure compressor rotor.

The turbine engine core may also include a third rotating structure. The third rotating structure may include a third structure compressor rotor and a third structure turbine rotor.

A rotational axis of the propulsor rotor may be offset from the centerline axis of the turbine engine core.

The propulsor rotor may be an open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
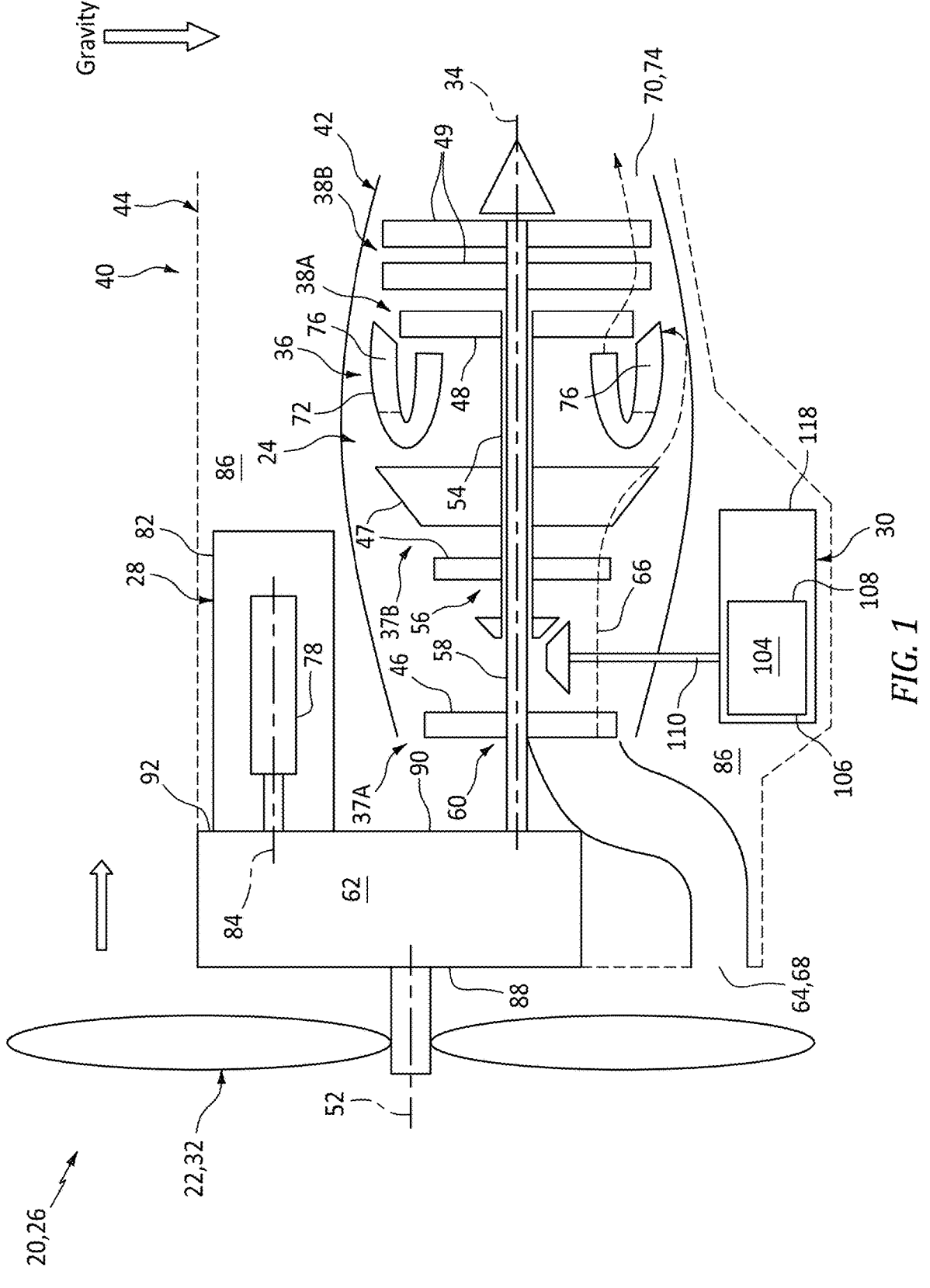
FIG. 1 is a side schematic illustration of an aircraft propulsion system.

FIG. 1 illustrates a hybrid electric propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 includes a bladed propulsor rotor 22 and a core 24 of a gas turbine engine 26 configured to mechanically drive rotation of the propulsor rotor 22. The aircraft propulsion system 20 of FIG. 1 also includes an electric machine 28 and an accessory gearbox system 30 arranged with the turbine engine 26.

The propulsor rotor 22 is an air mover disposed outside of the engine core 24. The propulsor rotor 22 may be an open propulsor rotor (e.g., an un-ducted propulsor rotor) or a ducted propulsor rotor. Examples of the open propulsor rotor include: a propeller rotor 32 where the turbine engine 26 is a turboprop engine; a propfan rotor where the turbine engine 26 is a propfan engine; and a pusher fan rotor where the turbine engine 26 is a pusher fan engine. An example of the ducted propulsor rotor is a fan rotor where the turbine engine 26 is a turbofan engine, and the fan rotor is disposed in a fan section of the turbine engine 26. The present disclosure, of course, is not limited to the foregoing exemplary propulsor rotor configurations nor to the foregoing exemplary turbine engine configurations. However, for case of description, the turbine engine 26 is generally described below as the turboprop engine (here, a hybrid turboprop engine), and the propulsor rotor 22 is generally described below as the propeller rotor 32 of the turboprop engine.

The engine core 24 extends axially along a core axis 34 from a first (e.g., forward, upstream) end of the engine core 24 to a second (e.g., aft, downstream) end of the engine core 24. This core axis 34 may be a centerline axis of the engine core 24 and/or one or more of its members. The core axis 34 may also or alternatively be a rotational axis of one or more rotating members of the engine core 24. The engine core 24 includes a compressor section, a combustor section 36 and a turbine section. The compressor section of FIG. 1 includes a low pressure compressor (LPC) section 37A and a high pressure compressor (HPC) section 37B. The turbine section of FIG. 1 includes a high pressure turbine (HPT) section 38A and a low pressure turbine (LPT) section 38B.

The engine sections 37A, 37B, 36, 38A and 38B may be arranged sequentially axially along the core axis 34. These engine sections 37A, 37B, 36, 38A and 38B are disposed within an engine housing 40. The engine housing 40 of FIG. 1 includes an engine case 42 (e.g., a core case) and a nacelle 44. The engine case 42 of FIG. 1 houses the engine core 24 and its engine sections 36-38B. The nacelle 44 of FIG. 1 houses and forms an aerodynamic covering over the engine case 42 as well as the electric machine 28 and the accessory gearbox system 30. The propeller rotor 32 (the propulsor rotor 22) of FIG. 1 is disposed outside of the engine housing 40.

The LPC section 37A includes a low pressure compressor (LPC) rotor 46. The HPC section 37B includes a high pressure compressor (HPC) rotor 47. The HPT section 38A includes a high pressure turbine (HPT) rotor 48. The LPT section 38B includes a low pressure turbine (LPT) rotor 49. Each of these engine rotors 46-49 and the propeller rotor 32 includes a plurality of rotor blades arranged circumferentially around and connected to one or more respective rotor disks. The rotor blades, for example, may be formed integral with or mechanically fastened, welded, brazed and/or otherwise attached to the respective rotor disk(s). Each of the engine rotors 46-49 is rotatable about the core axis 34. The propeller rotor 32, by contrast, may be rotatable about a rotational propeller axis 52 which is laterally offset from the core axis 34. The propeller axis 52 of FIG. 1, for example, is disposed vertically above the core axis 34. It is contemplated, however, the propeller axis 52 (or more generally the propulsor axis) may alternatively be coaxial with the core axis 34 for other turbine engine types/configurations. Herein, the term "vertical" may be used to describe an up-and-down direction relative to gravity (e.g., a direction parallel to gravity) when, for example, the aircraft is on ground and/or flying in level flight. The term "horizontal" may be used to describe a side-to-side direction relative to gravity (e.g., a direction perpendicular to gravity, a direction parallel with a horizon line) when, for example, the aircraft is on ground and/or flying in level flight.

The HPC rotor 47 is coupled to and rotatable with the HPT rotor 48. The HPC rotor 47 of FIG. 1, for example, is connected to the HPT rotor 48 by a high speed shaft 54. At least (or only) the HPC rotor 47, the HPT rotor 48 and the high speed shaft 54 collectively form a high speed rotating structure 56; e.g., a high speed spool of the engine core 24.

The LPC rotor 46 is coupled to and rotatable with the LPT rotor 49. The LPC rotor 46 of FIG. 1, for example, is connected to the LPT rotor 49 by a low speed shaft 58. At least (or only) the LPC rotor 46, the LPT rotor 49 and the low speed shaft 58 collectively form a low speed rotating structure 60; e.g., a low speed spool of the engine core 24. This low speed rotating structure 60 is further coupled to the propeller rotor 32 (the propulsor rotor 22) through a geartrain 62; e.g., a transmission, a speed reduction gearbox, an epicyclic geartrain, etc. This geartrain 62 operatively couples the low speed rotating structure 60 and its LPT rotor 49 to the propeller rotor 32. With this arrangement of FIG. 1, the propeller rotor 32 may rotate at a different (e.g., slower) rotational velocity than the low speed rotating structure 60 and its LPT rotor 49.

During operation of the turbine engine 26 of FIG. 1, ambient air from outside of the aircraft propulsion system 20 enters the aircraft propulsion system 20 through an airflow inlet 64. This airflow inlet 64 may be formed as an opening in the nacelle 44 and/or a scoop. The airflow inlet 64 of FIG.

1 is disposed vertically below the geartrain 62, for example next to and downstream of the propeller rotor 32. The ambient air received (e.g., ingested) by the airflow inlet 64 is directed into a core flowpath 66. The air within the core flowpath 66 may be referred to as "core air".

The core flowpath 66 extends sequentially through the LPC section 37A, the HPC section 37B, the combustor section 36, the HPT section 38A and the LPT section 38B from an airflow inlet 68 into the core flowpath 66 to a combustion products exhaust 70 from the core flowpath 66. More particularly, the core flowpath 66 extends sequentially across the LPC rotor 46, the HPC rotor 47, a combustor 72 (e.g., an annular combustor) in the combustor section 36, the HPT rotor 48 and the LPT rotor 49 between the core inlet 68 and the core exhaust 70. Here, the core inlet 68 is the same as the airflow inlet 64, and the core exhaust 70 is the same as a combustion products exhaust 74 from the aircraft propulsion system 20. It is contemplated, however, the core inlet 68 may alternatively be downstream of the airflow inlet 64 and/or the core exhaust 70 may be upstream of the combustion products exhaust 74 for other turbine engine types/configurations; e.g., where the turbine engine 26 further includes a bypass flowpath or the like.

The core air is compressed by the LPC rotor 46 and the HPC rotor 47 and directed into a combustion chamber 76 (e.g., an annular combustion chamber) of the combustor 72 in the combustor section 36. Fuel is injected into the combustion chamber 76 by one or more fuel injectors and mixed with the compressed core air to provide a fuel-air mixture. This fuel-air mixture is ignited and combustion products thereof flow through and sequentially drive rotation of the HPT rotor 48 and the LPT rotor 49 about the core axis 34. The rotation of the HPT rotor 48 and the LPT rotor 49 respectively drive rotation of the HPC rotor 47 and the LPC rotor 46 about the core axis 34 and, thus, compression of the air received from the core inlet 68. The rotation of the LPT rotor 49 also drives rotation of the propeller rotor 32 (the propulsor rotor 22) about the propeller axis 52 through the geartrain 62. The rotation of the propeller rotor 32 of FIG. 1 propels the ambient air outside of the aircraft propulsion system 20 and its engine housing 40 in an aft direction. Here, some of this propelled ambient air enters the aircraft propulsion system 20 through the airflow inlet 64, while a majority of the propelled ambient air bypasses (e.g., flows outside of and along) the turbine engine 26 and its engine core 24 to provide thrust.

Figure 2:
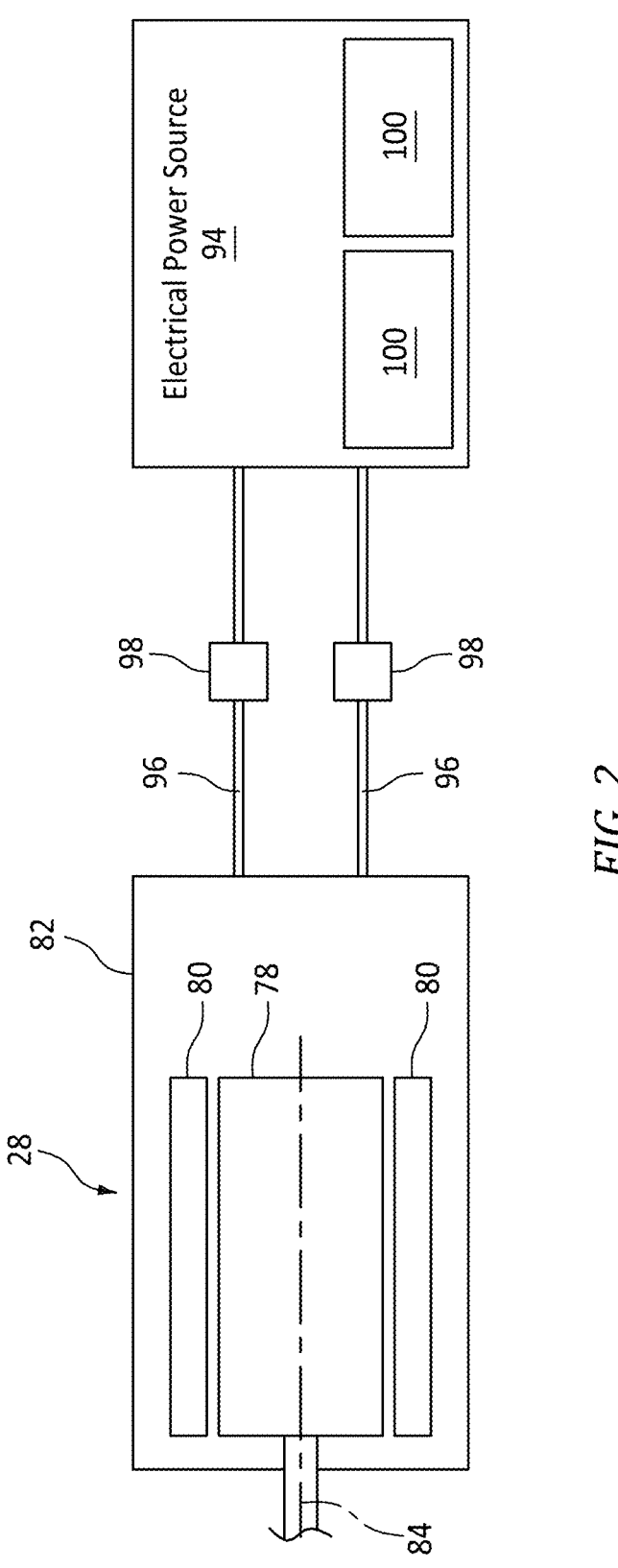
FIG. 2 is a schematic illustration of an electric machine coupled with an electrical power source.

Referring to FIG. 2, the electric machine 28 includes an electric machine rotor 78, an electric machine stator 80 and an electric machine housing 82. The machine rotor 78 is rotatable about a rotational electric machine axis 84 of the machine rotor 78, which machine axis 84 may also be an axial centerline of the electric machine 28. The machine stator 80 of FIG. 2 is radially outboard of and circumscribes the machine rotor 78. With this arrangement, the electric machine 28 is configured as a radial flux electric machine. The electric machine 28 of the present disclosure, however, is not limited to such an exemplary rotor-stator configuration nor to radial flux arrangements. The machine rotor 78, for example, may alternatively be radially outboard of and circumscribe the machine stator 80. In another example, the machine rotor 78 may be axially next to the machine stator 80 configuring the electric machine 28 as an axial flux electric machine. Referring again to FIG. 2, the machine rotor 78 and the machine stator 80 are at least partially or completely housed within the machine housing 82.

Referring to FIG. 1, the electric machine 28 is arranged within an interior chamber 86 (e.g., a cavity) of the engine housing 40 radially between the engine case 42 and the nacelle 44. Here, the propeller rotor 32 is disposed to an axial first (e.g., forward, upstream) side 88 of the geartrain 62, and the engine core 24 and the electric machine 28 are disposed to an axial second (e.g., aft, downstream) side 90 of the geartrain 62 which is opposite the first side 88. The electric machine 28 may be disposed vertically above the engine core 24 and the engine case 42. The electric machine 28 and the airflow inlet 64 may thereby be disposed to (e.g., diametrically) opposing sides of the engine core 24. The electric machine 28 and its machine housing 82 may be mounted to a housing 92 of the geartrain 62, which geartrain housing 92 houses an internal gear system of the geartrain 62. The machine rotor 78 is operatively coupled to the propeller rotor 32 and/or the low speed rotating structure 60 through the geartrain 62. Here, the machine rotor 78 is operatively coupled to the propeller rotor 32 through the geartrain 62 independent of the engine core 24 and its low speed rotating structure 60, and vice versa. The present disclosure, however, is not limited to such an exemplary arrangement.

The electric machine 28 of FIG. 2 may be configurable as an electric motor and/or an electric generator; e.g., a motor-generator. For example, during a motor mode of operation, the electric machine 28 may operate as the electric motor to convert electricity received from an electrical power source 94 into mechanical power. The machine stator 80, for example, may generate an electromagnetic field with the machine rotor 78 using the electricity. This electromagnetic field may drive rotation of the machine rotor 78 about the machine axis 84. The machine rotor 78 may thereby drive rotation of the propeller rotor 32 through the geartrain 62 (sec FIG. 1). This mechanical power may be provided to the propulsor rotor 22 to boost power from the engine core 24 or completely power rotation of the propeller rotor 32. During a generator mode of operation, the electric machine 28 may operate as the electric generator to convert mechanical power received from, for example, the engine core 24 and its low speed rotating structure 60 into electricity. The low speed rotating structure 60, for example, may drive rotation of the machine rotor 78 through the geartrain 62, for example, in addition to driving the rotation of the propeller rotor 32. The rotation of the machine rotor 78 may generate an electromagnetic field with the machine stator 80, and the machine stator 80 may convert energy from the electromagnetic field into the electricity. The electric machine 28 may then provide this electricity to the power source 94 for further use, storage and/or distribution. Of course, in other embodiments, the electric machine 28 may alternatively be configured as a dedicated electric motor (e.g., without the electric generator functionality), or a dedicated electric generator (e.g., without the electric motor functionality).

The power source 94 is electrically coupled with the electric machine 28 through electrical circuitry; e.g., a power bus. This electrical circuitry may include one or more electrical leads 96 (e.g., high voltage lines) and one or more electrical devices 98 for conditioning, metering, regulating and/or otherwise controlling electrical power transfer between the electric machine 28 and the power source 94. Examples of the electrical devices 98 include, but are not limited to, switches, current regulators, converters and buffers. The power source 94 is configured to store electricity. The power source 94 is also configured to provide the stored electricity to the electric machine 28 and/or receive electricity from the electric machine 28; e.g., during recharging. The power source 94, for example, may be configured as or otherwise include one or more electricity storage devices 100; e.g., batteries, battery banks, super capacitors, etc.

Figures 3A, 3B:
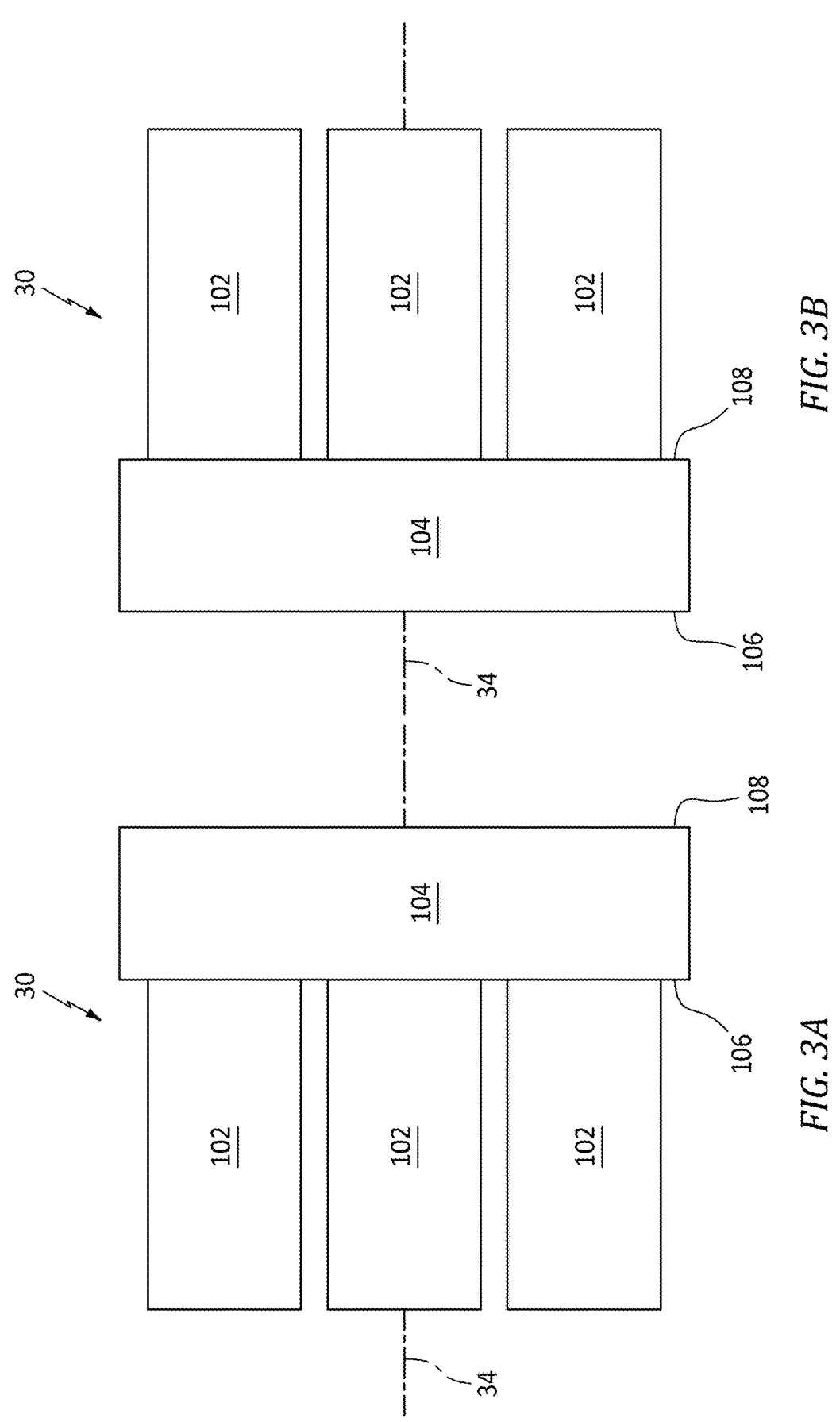
FIGS. 3A and 3B are schematic illustrations of an accessory gearbox system with various arrangements of engine accessories.

Referring to FIGS. 3A and 3B, the accessory gearbox system 30 includes one or more engine accessories 102 and an accessory gearbox 104. Examples of the engine accessories 102 include, but are not limited to, a lubricant pump, a fuel pump, a hydraulic pump, a pneumatic compressor, a starter motor and a generator. The engine accessories 102 of FIG. 3A are mounted to an axial first (e.g., forward, upstream) side 106 of the accessory gearbox 104. The engine accessories 102 of FIG. 3B are mounted to an axial second (e.g., aft, downstream) side 108 of the accessory gearbox 104 opposite the first side 106. The present disclosure, however, is not limited to such exemplary arrangements. The engine accessories 102, for example, may alternatively be mounted to both the axial first and second sides 106 and 108 of the accessory gearbox 104 and/or to one or more lateral (e.g., circumferential) sides of the accessory gearbox 104.

Referring to FIG. 1, the accessory gearbox 104 is configured to operatively couple the engine accessories 102 (see FIGS. 3A and 3B) to the engine core 24. A tower shaft 110, for example, may operatively couple the engine core 24 and its high speed rotating structure 56 to the accessory gearbox 104 and, therethrough, the engine accessories 102 (see FIGS. 3A and 3B). A radial inner end of the tower shaft 110 is coupled to the high speed rotating structure 56 and its high speed shaft 54. At this shaft inner end, the tower shaft 110 of FIG. 1 is disposed axially between the HPC rotor 47 and the LPC rotor 46. However, in other embodiments, it is contemplated the LPC rotor 46 may alternatively be disposed axially between the tower shaft 110 and the HPC rotor 47. Moreover, it is contemplated the tower shaft 110 may be replaced by another power transmission device (or devices) similarly positioned or alternatively positioned relative to the engine core 24 and its members 46 and 47.

The accessory gearbox system 30 and its accessory gearbox 104 are arranged within the interior chamber 86 of the engine housing 40 radially between the engine case 42 and the nacelle 44. Here, the geartrain 62 is disposed axially between the propeller rotor 32 and the accessory gearbox system 30. While the accessory gearbox system 30 may be axially spaced from the geartrain 62, the electric machine 28 of FIG. 1 may still axially overlap at least an axial first (e.g., forward, upstream) portion of the accessory gearbox system 30. Therefore, to spatially accommodate both the electric machine 28 and the accessory gearbox system 30 within the interior chamber 86, the accessory gearbox system 30 is circumferentially offset from the electric machine 28 about the core axis 34. The accessory gearbox system 30 of FIG. 1, for example, is disposed vertically below the engine core 24 and its engine case 42; e.g., exactly or substantially diametrically opposite the electric machine 28. Here, the accessory gearbox system 30 may be circumferentially aligned with the airflow inlet 64. The accessory gearbox system 30 is also disposed axially aft, downstream of the airflow inlet 64 (relative to flow outside of the engine housing 40). Thus, any bulge included in the nacelle 44 to accommodate the placement of the accessory gearbox system 30 (if needed) may be relatively small since the nacelle 44 may already include a bulge/outcropping for the airflow inlet 64. Moreover, referring to FIG. 4, the tower shaft 110 (or other power transmission device) may be circumferentially aligned with or near a lateral midpoint of the airflow inlet 64, thereby facilitating a symmetrical flow pattern through a vane arrangement 112. Here, a vane 114 of the vane arrangement 112 accommodating the tower shaft 110 is sized differently (e.g., larger) than other vanes 116 of the vane arrangement 112.

In some embodiments, referring to FIG. 1, an entirety of the electric machine 28 may be disposed axially between the geartrain 62 and an axial second (e.g., aft, downstream) side 118 of the accessory gearbox system 30. In other embodiments, the electric machine 28 may project axially aft, downstream beyond the second side 118 of the accessory gearbox system 30.

Figure 4:
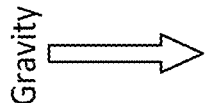
FIG. 4 is a cross-sectional schematic illustration of the aircraft propulsion system with the accessory gearbox system at a bottom position.
Figure 5:
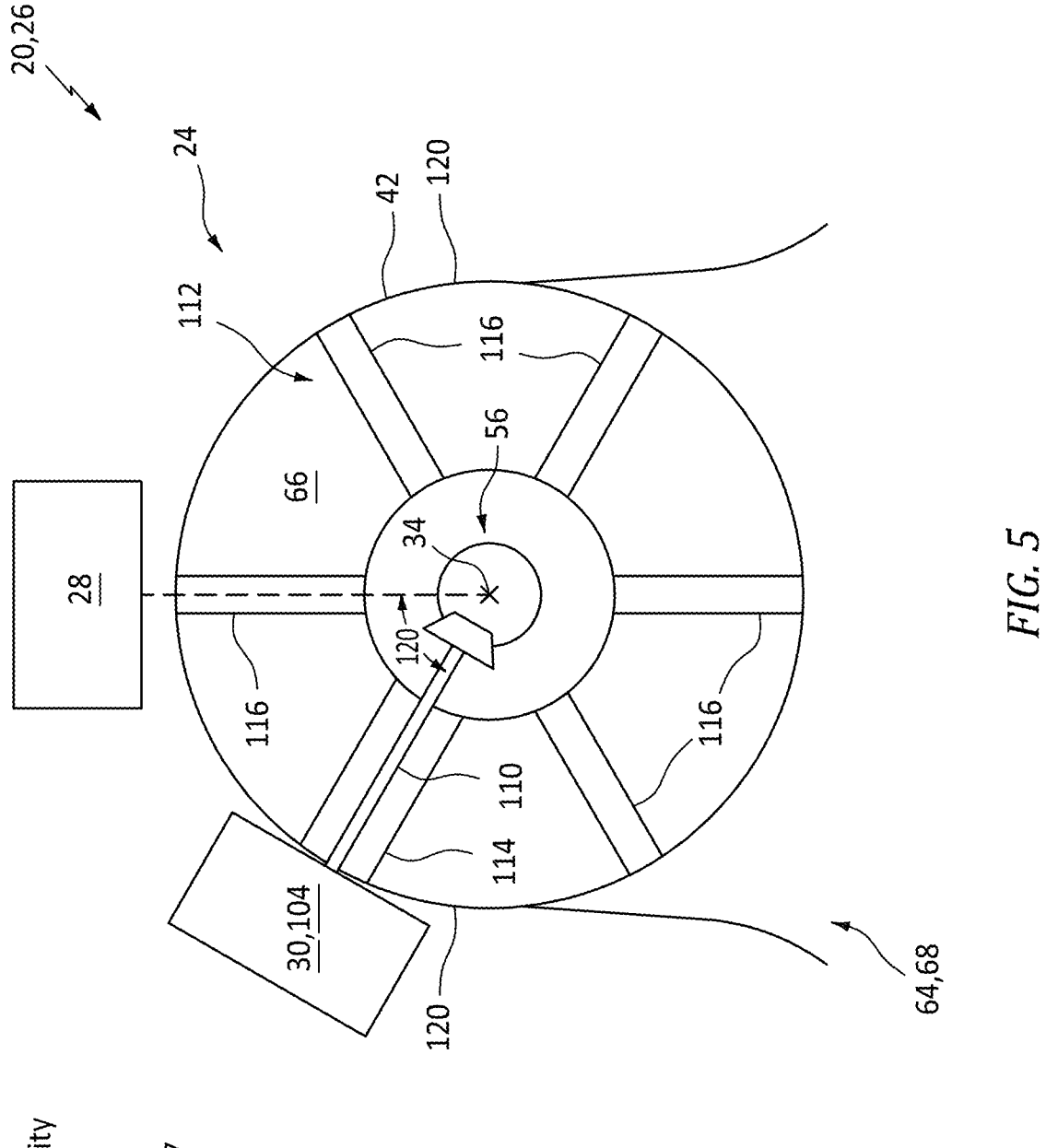
FIG. 5 is a cross-sectional schematic illustration of the aircraft propulsion system with the accessory gearbox system at a side position.

In some embodiments, referring to FIG. 4, the accessory gearbox system 30 may be disposed vertically below the engine core 24 and the engine case 42. In other embodiments, referring FIG. 5, the accessory gearbox system 30 may be disposed to a horizontal side 120 of the engine core 24 and its engine case 42. Both in FIGS. 4 and 5, a lateral center of the accessory gearbox system 30 may be circumferentially spaced from a lateral center of the electric machine 28 about the core axis 34 by an offset angle 120. This offset angle 120 may be between thirty degrees (30°) and one-hundred and eighty degrees (180°). For example, referring to FIG. 4, the offset angle 120 may be equal to or greater than one-hundred and twenty degrees (120°). In another example, referring to FIG. 5, the offset angle 120 may be between sixty degrees (60°) and one-hundred and twenty degrees (120°).

Figure 6:
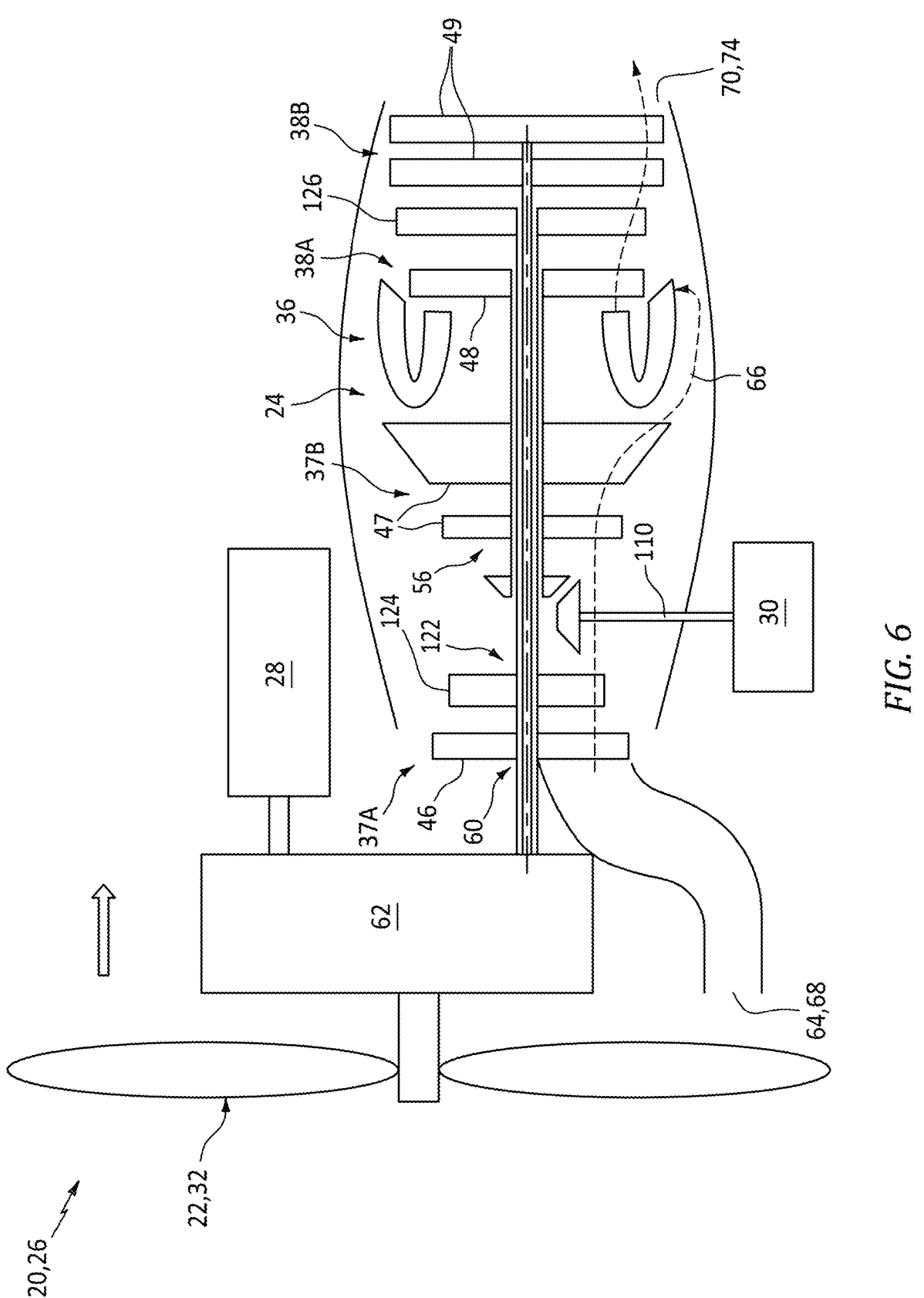
FIG. 6 is a side schematic illustration of the aircraft propulsion system with an intermediate speed rotating structure.

In some embodiments, referring to FIG. 1, the turbine engine 26 and its engine core 24 may be configured with the two engine rotating structures 56 and 60; e.g., spools. In other embodiments, referring to FIG. 6, the turbine engine 26 and its engine core 24 may be configured with more than two engine rotating structures; e.g., spools. The engine core 24 of FIG. 6, for example, also includes an intermediate speed rotating structure 122 with an intermediate pressure compressor (IPC) rotor 124 and an intermediate pressure turbine (IPT) rotor 126. The IPC rotor 124 is disposed between the LPC rotor 46 and the HPC rotor 47 along the core flowpath 66. The IPC rotor 124 may also be disposed axially between the tower shaft 110 and the LPC rotor 46 along the core axis. The IPT rotor 126 is disposed between the HPT rotor 48 and the LPT rotor 49 along the core flowpath 66.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:

a geartrain;

a propulsor rotor disposed to a first side of the geartrain;

a turbine engine core disposed to a second side of the geartrain, the turbine engine core operatively coupled to the propulsor rotor through the geartrain;

an electric machine disposed to the second side of the geartrain, the electric machine operatively coupled to at least one of the propulsor rotor or the turbine engine core through the geartrain; and an accessory gearbox system operatively coupled to the turbine engine core, the accessory gearbox system circumferentially offset from the electric machine about a centerline axis of the turbine engine core, and the accessory gearbox system axially overlapping the electric machine along the centerline axis of the turbine engine core;

wherein the accessory gearbox system comprises an accessory gearbox and an engine accessory mounted to an axially forward side of the accessory gearbox; and wherein an entirety of the electric machine is disposed axially between the geartrain and an aft end of the accessory gearbox system.

2. The propulsion system of claim 1, wherein the electric machine and the accessory gearbox system are disposed to opposing sides of the turbine engine core.

3. The propulsion system of claim 1, wherein a center of the accessory gearbox system is spaced circumferentially from a center of the electric machine between thirty degrees and one-hundred and eighty degrees about the centerline axis of the turbine engine core.

4. The propulsion system of claim 1, wherein the electric machine is disposed vertically above the turbine engine core.

5. The propulsion system of claim 4, wherein the accessory gearbox system is disposed vertically below the turbine engine core.

6. The propulsion system of claim 4, wherein the accessory gearbox system is disposed to a horizontal side of the turbine engine core.

7. The propulsion system of claim 1, wherein the accessory gearbox system is circumferentially aligned with an airflow inlet into the propulsion system.

8. The propulsion system of claim 7, wherein the accessory gearbox system is coupled to the first rotating structure through a tower shaft, the tower shaft is circumferentially aligned with a lateral midpoint of the airflow inlet at a vane arrangement having a plurality of vanes, and a first vane of the plurality of vanes aligned with the lateral midpoint is sized larger than remaining vanes of the plurality of vanes to accommodate the tower shaft.

9. The propulsion system of claim 1, wherein the electric machine is configurable at least as an electric motor.

10. The propulsion system of claim 1, wherein the electric machine is configurable at least as an electric generator.

11. The propulsion system of claim 1, wherein the accessory gearbox operatively couples the engine accessory to the turbine engine core.

12. The propulsion system of claim 1, wherein the turbine engine core comprises a first rotating structure;

the first rotating structure includes a first structure compressor rotor and a first structure turbine rotor; and the accessory gearbox system is coupled to the first rotating structure through a tower shaft.

13. The propulsion system of claim 12, wherein the turbine engine core further comprises a second rotating structure;

the second rotating structure includes a second structure turbine rotor; and the second rotating structure is operatively coupled to the propulsor rotor through the geartrain.

14. The propulsion system of claim 13, wherein the second rotating structure further includes a second structure compressor rotor; and the tower shaft is disposed axially between the first structure compressor rotor and the second structure compressor rotor.

15. The propulsion system of claim 13, wherein the turbine engine core further comprises a third rotating structure; and the third rotating structure includes a third structure compressor rotor and a third structure turbine rotor.

16. The propulsion system of claim 1, wherein a rotational axis of the propulsor rotor is offset from the centerline axis of the turbine engine core.

17. The propulsion system of claim 1, wherein the propulsor rotor is an open propulsor rotor.

* * * * *